United States Patent [19]
Moriyama

[11] 4,117,898
[45] Oct. 3, 1978

[54] ELECTRONIC TARE SYSTEM FOR ELECTRICAL BALANCE

[75] Inventor: Kenneth J. Moriyama, Placentia, Calif.

[73] Assignee: Ventron Corporation, Beverly, Mass.

[21] Appl. No.: 820,114

[22] Filed: Jul. 29, 1977

[51] Int. Cl.² ............................................. G01G 23/14
[52] U.S. Cl. ............................... 177/165; 177/DIG. 3; 235/92 WT
[58] Field of Search ........... 177/165, 164, 25, DIG. 3; 235/92 WT; 364/567, 602

[56] References Cited
U.S. PATENT DOCUMENTS

| 3,812,923 | 5/1974 | Rock | 117/165 X |
| 3,888,321 | 6/1975 | Wiiki | 177/165 |

Primary Examiner—Joseph W. Hartary
Attorney, Agent, or Firm—Fraser and Bogucki

[57] ABSTRACT

An electronic tare system used in an electrical balance of the type which generates an electrical signal representing a mass being weighed for application to a digital read out or other display is capable of bipolar operation over a range much greater than that of the balance by generating and storing a digital value in response to the combined analog signals at an electrical summing junction coupled to receive both the electrical signal from the balance and an analog electrical signal generated from the stored digital value. An up-down counter coupled through a digital-to-analog converter to the summing junction counts in response to the output of a high gain amplifier coupled in a feedback loop to the output of the summing junction during the first portion of a tare mode of operation until the output of the digital-to-analog converter to the summing junction effectively equals and nulls the signal from the balance. Thereafter, the count stored in the counter which represents the weight of a sample holder on the balance is converted into an analog electrical signal which is subtracted from the signal from the balance representing the combined weight of the sample holder and a sample therein with the difference therebetween being applied to the digital read out to indicate the weight of the sample.

14 Claims, 4 Drawing Figures

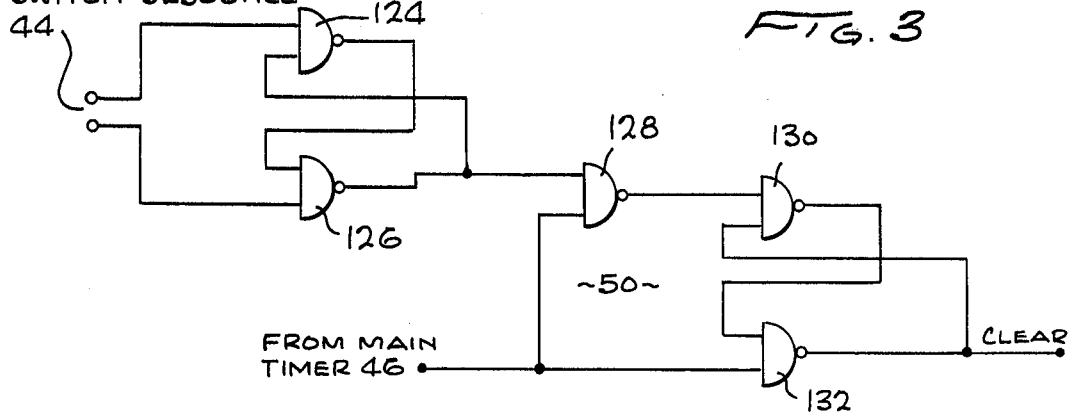
FIG. 3
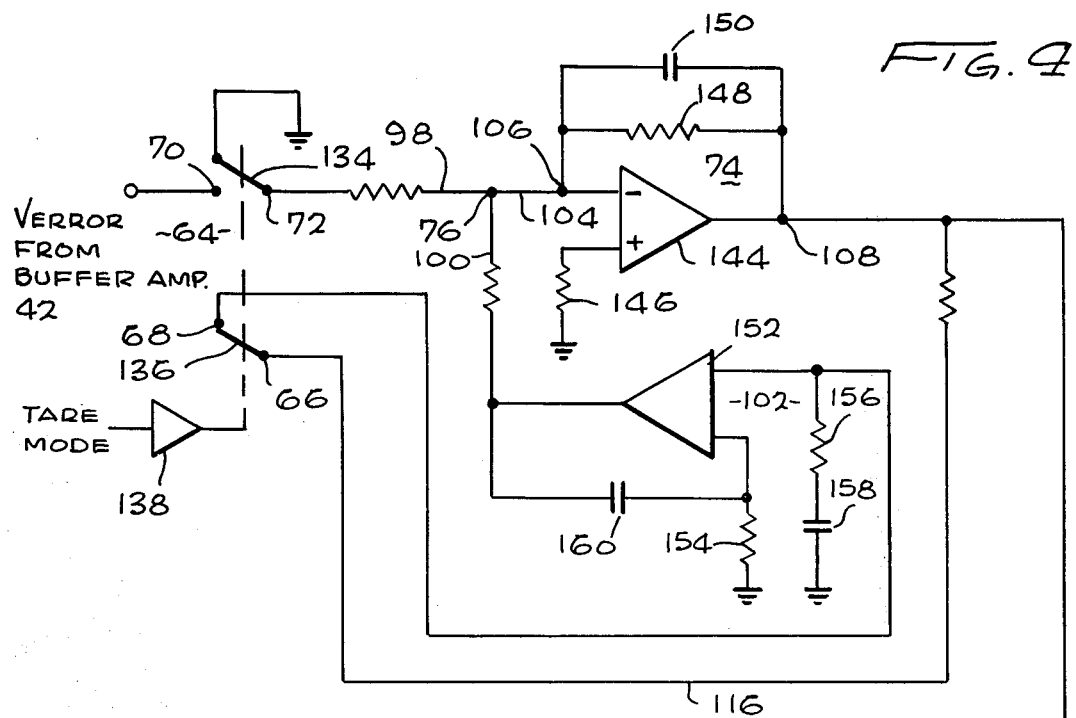
FIG. 4
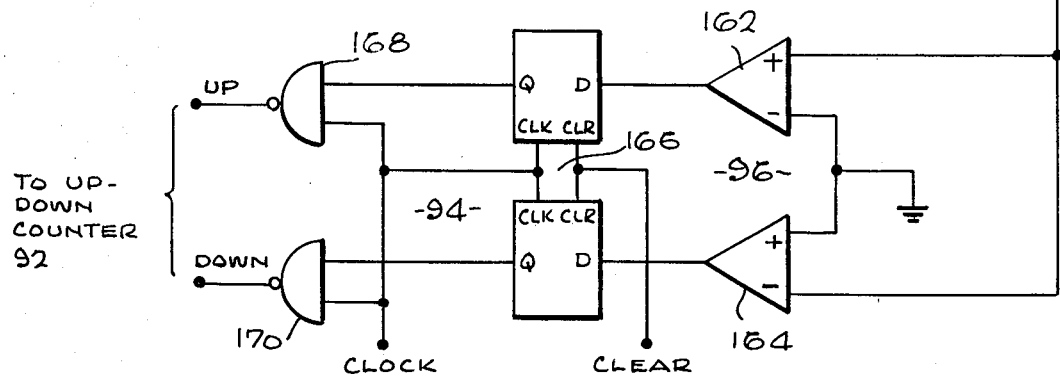

ELECTRONIC TARE SYSTEM FOR ELECTRICAL BALANCE

BACKGROUND OF THE INVENTION

1. Field of the Invention

The present invention relates to electrical balances in which an electrical signal generated so as to null the balance electromagnetically is provided to a digital read out or other display for the balance, and more particularly to electrical balances of this type having a tare capability in which the weight of a sample holder can be electrically determined and thereafter subtracted from the combined weight of the sample holder and included sample to provide a direct indication of sample weight.

2. History of the Prior Art

It is known in the art to provide electrical microbalances for weighing relatively small masses to a high level of precision. Such balances typically generate an electrical signal having a magnitude representing the mass being weighed. The signal is provided to an appropriate display such as a digital read out for providing a visual or other indication of the weight of the mass being weighed. In many cases the electrical signal is also applied to an electromechanical arrangement in a servoing arrangement which provides the signal with a magnitude just sufficient to enable the electromechanical device to compensate for the weight of the mass and thereby null the balance.

Electrical balances of this type are frequently provided with tare systems whereby the weight of a sample holder can be determined and stored for later subtraction from the total weight of the sample holder and an included sample to thereby provide a direct indication of the sample weight. Examples of such arrangements are provided by U.S. Pat. Nos. 3,684,875 to Smith et al, 3,777,828 to Dietemeyer, 3,812,923 to Rock, 3,851,720 to Williams, 3,853,267 to Cadwell et al, 3,860,077 to Utzinger et al, 3,861,479 to Pryor, 3,888,321 to Wiiki et al and 3,962,570 to Loshbough et al.

Electronic tare systems of the prior art such as those described in the above-noted patents have certain inherent limitations which detract from their usefulness and may even render them unsuitable for certain applications. One of the most important limitations in such arrangements is that the tare weight corresponding to the weight of the sample holder is limited by the range of the balance. Thus if the range of the balance is 100 Mg, it may be difficult or impossible to operate in the tare mode using sample holders weighing much in excess of 100 Mg. This can be a severe limitation when it is considered that the sample holder often weighs as much as several times more than the samples therein being weighed. The weight of the sample holder is typically determined digitally with the digital value being stored for later subtraction from a digital value representing the combined weight of the sample holder and an included sample. Still other limitations in prior art tare systems arise from the fact that such systems are typically unipolar in the sense that the value or signal representing tare weight has a fixed polarity and is always generated by changes of fixed polarity in the value or signal.

Accordingly, it would be advantageous to provide a tare system for an electrical balance in which tare weight is not limited by the range of the balance.

It would furthermore be advantageous to provide a tare system which has a bipolar capability.

It would still furthermore be advantageous to provide a tare system which determines the tare weight in a relatively rapid, efficient and accurate fashion and which remains ready to enter a tare mode operation substantially unaffected by signal drifts and other common circuit conditions of that type.

BRIEF SUMMARY OF THE INVENTION

Electronic tare systems in accordance with the invention avoid limiting the tare weight to the range of the balance by converting a stored digital value into a corresponding analog signal which is combined with the signal from the balance at a summing junction. During the first part of a tare mode of operation when the weight of the sample holder is being determined, a feedback loop coupled to the summing junction responds to the signal condition at the summing junction by changing the stored digital value until a point is reached at which the analog signal converted from the stored digital value cancels the signal from the balance to provide a null condition in which the stored digital value represents the weight of the sample holder. Thereafter, the analog signal converted from the stored digital value is subtracted from the signal from the balance in the summing junction such that the difference therebetween representing the weight of the sample which has been added to the sample holder is passed to a digital read out or other display for the balance. Because the weight of the sample holder is compared and subtracted by use of analog signals, the range of possible sample holder weights which may be generated and stored is not dependent upon the range of the balance and may be many times that of the balance. In addition the digital value representing the sample holder weight can be generated, stored and altered in bipolar fashion since it is isolated from the balance by conversion into analog signals which are simply algebraically summed to provide the desired difference signal to the read out for the balance.

In a preferred embodiment of an electronic tare system in accordance with the invention the digital value is provided by an up-down counter coupled through a digital-to-analog converter to an electrical summing junction. A mode switching relay which normally couples the electrical signal from the balance directly to the display for the balance responds to a tare mode command to pass the signal from the balance to the electrical summing junction where it is algebraically combined with the analog signal representing the digital value in the counter. The resulting difference is applied to the feedback loop where a high gain amplifier coupled to the counter via bipolar and logic circuitry responds by causing the counter to count in the appropriate direction so as to reduce the difference signal at the summing junction. The counter counts in response to clock pulses which initially have a high frequency to provide maximum correction over a short period of time and thereafter have a lower frequency so as to provide slower and more precise correction as the sum of the signals at the summing junction is reduced to zero to achieve a null condition. Thereafter the digital value in the counter representing the weight of the sample holder is converted into an electrical signal by the digital-to-analog converter for subtraction from the electrical signal from the balance representing the combined weight of the sample holder and an included sample. The difference representing the weight of the sample is passed to the digital read out or other display for the balance. At the same time the feedback loop is disabled in favor of a negative feedback loop which is coupled between the output and input of the high gain amplifier and which biases the input of the amplifier so as to tend to maintain the output of the amplifier at zero. This compensates for the drift that typically occurs in such amplifiers, thereby providing a reference which enables the tare system to be ready for immediate and positive action in response to receipt of the next tare command.

The tare system is controlled by an arrangement which responds to closure of a tare switch by activating the main feedback loop and switching the electrical signal from the balance to the summing junction during a tare mode interval defined by timing circuitry. The timing circuitry also provides the clock signal with high and low frequencies during selected portions of the tare mode interval. Logic circuitry responds to two or more pulses from the tare switch within a given interval signifying that the tare mode is to be cancelled by generating a clear signal which resets the counter and returns all other components to the normal, non-tare mode of operation.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 3 is a schematic diagram of one portion of the system of FIG. 1; and

FIG. 4 is a schematic diagram of another portion of the system of FIG. 1.

DETAILED DESCRIPTION

Figure 1:
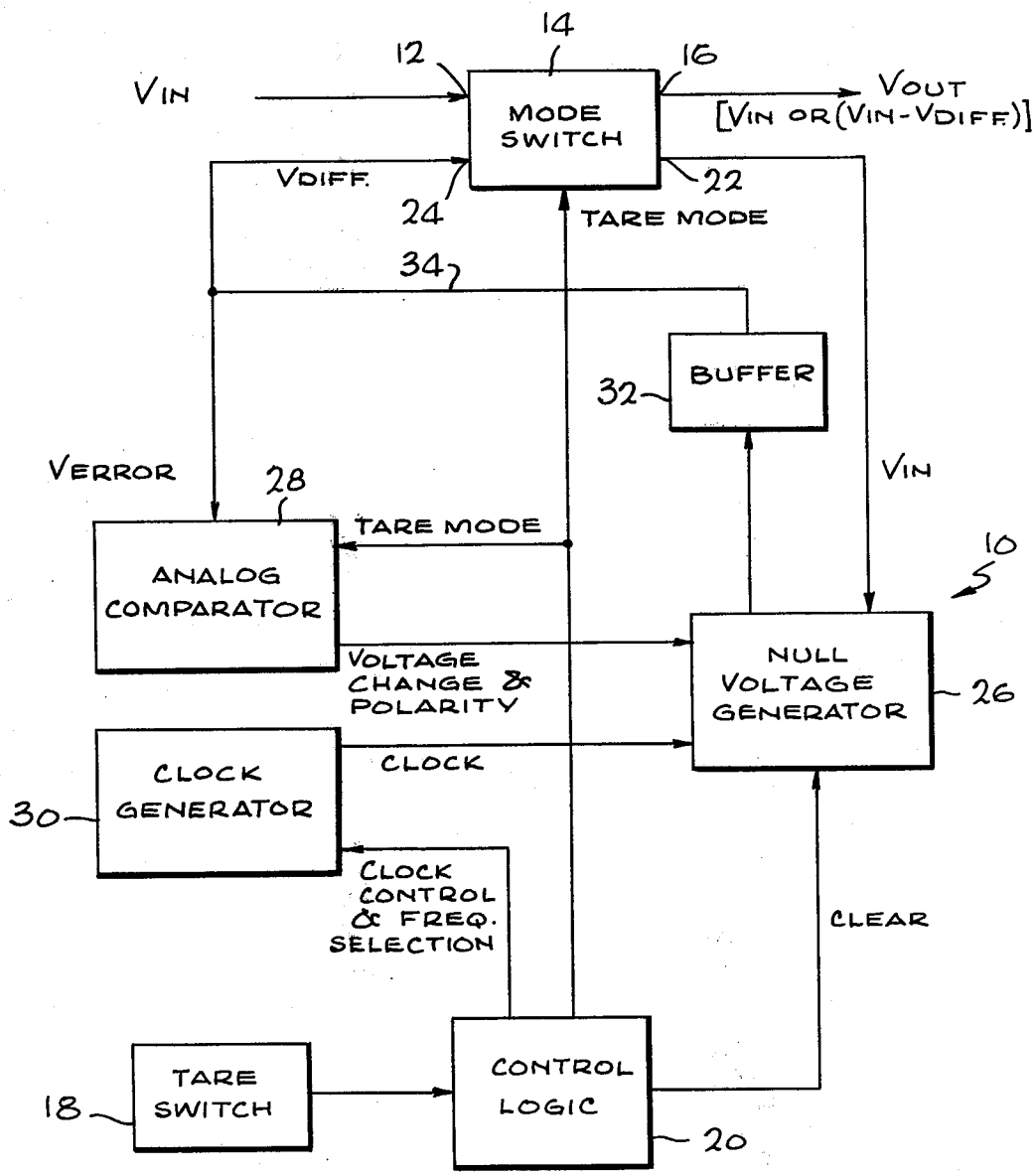
FIG. 1 is a block diagram of an electronic tare system in accordance with the invention.

FIG. 1 depicts an electronic tare system 10 in accordance with the invention in basic block diagram form. The system 10 of FIG. 1 is used in conjunction with an electronic microbalance of the type which generates an electrical signal having a magnitude representing a mass being weighed with the signal being applied to a digital read out or other output display for the balance. The balance (not shown in FIG. 1) may be of appropriate conventional design, the details thereof being unimportant to the invention.

The electrical signal from the balance is applied as a voltage $V_{IN}$ to an input terminal 12 of a mode switch 14. The mode switch 14 has an output terminal 16 coupled to provide an output voltage $V_{OUT}$ to the digital read out or other display for the balance. Accordingly, the tare system 10 is installed in the balance by serially coupling the mode switch 14 in the lead of the balance which provides the electrical weight signal to the digital read out.

During normal operation the mode switch couples the input terminal 12 to the output terminal 16 such that the electrical weight signal is coupled directly to the digital display of the balance to allow the balance to operate in normal, conventional fashion. Upon momentary actuation of a tare switch 18, however, control logic 20 provides a tare mode signal to the mode switch 14, causing the input terminal 12 to be coupled to a second output terminal 22 and a second input terminal 24 to be coupled to the output terminal 16. Coupling of the input terminal 12 to the output terminal 22 applies the voltage $V_{IN}$ to a null voltage generator 26. As described in detail hereafter, the null voltage generator 26 functions under the control of an analog comparator 28 and in response to a clock signal from a clock generator 30 controlled by the control logic 20 to generate and store a digital value which when converted to an analog electrical signal is equivalent to $V_{IN}$. The digital value is generated with the aid of an electrical summing junction which algebraically combines $V_{IN}$ with the analog signal equivalent of the digital value. Any difference at the summing junction is applied via a buffer 32 to the analog comparator 28 in the form of an error signal $V_{ERROR}$. The analog comparator 28 responds to $V_{ERROR}$ by providing to the null voltage generator 26 a signal indicating the direction in which the stored digital value should be changed to bring $V_{ERROR}$ to zero and thereby achieve a null condition.

The null voltage generator 26 changes the digital value stored therein in a direction determined by the analog comparator 28 and at a rate determined by the clock signal from the clock generator 30. When the tare switch 18 is first actuated, the control logic 20 responds by defining a predetermined time interval in addition to generating the tare mode signal. During the first portion of the time interval, the clock generator 30 provides a clock signal of relatively high frequency to the null voltage generator 26 to cause the stored digital value to change at a relatively rapid rate in response to $V_{ERROR}$. During a second and remaining portion of the time interval, the clock generator 30 provides a clock of relatively low frequency to the null voltage generator 26 causing the stored digital value to change at a much slower rate. This allows the system to make coarse adjustments followed by fine adjustments, in the stored digital value while achieving null.

At the end of the time interval defined by the control logic 20 the null voltage generator 26 stores a digital value representing $V_{IN}$. If $V_{IN}$ is the result of a sample holder being placed on the balance, then the stored digital value at this point represents the weight of the sample holder. The stored digital value is converted into an analog signal which is equal in value to $V_{IN}$ and which is subtracted from $V_{IN}$ at the summing junction within the null voltage generator 26 to provide $V_{ERROR}$ with zero value at the output of the buffer 32. This results in $V_{OUT}$ being zero volts and in the digital read out of the balance reading zero to indicate that the tare system 10 has been nulled.

The analog comparator 28 and the buffer 32 form part of a primary feedback loop 34 coupled around the null voltage generator 26. Upon termination of the predetermined time interval defined by the control logic 20, the analog comparator 28 disables the primary feedback loop 34 and activates a negative feedback loop therein. As described in detail hereafter the analog comparator includes a high gain amplifier which responds to $V_{ERROR}$ by providing a signal indicating the appropriate direction of change of the digital value stored in the null voltage generator 26. The negative feedback loop within the analog comparator 28 biases the input of the high gain amplifier so as to tend to drive the amplifier output to zero. This provides a stable reference by compensating for drift in the high gain amplifier, so that the analog comparator 28 is ready to function in response to the next tare command from the tare switch 18.

When a null condition has been achieved within the electronic tare system 10 such that $V_{ERROR}$ is zero and the stored digital value in the null voltage generator represents the weight of the sample holder, the sample to be weighed may be placed on the sample holder within the balance. The increased mass results in an increase in $V_{IN}$ by an amount corresponding to the weight of the sample. The increase in $V_{IN}$ is determined by the null voltage generator 26 which subtracts the analog signal equivalent of the stored digital value from $V_{IN}$ at the summing junction. The resulting difference voltage $V_{DIFF}$ is temporarily stored in the buffer 32 along with being applied via the input terminal 24 and the output terminal 16 as $V_{OUT}$ to the digital read out of the balance to thereby provide a digital display representing the weight of the sample.

When it is desired to terminate the tare mode and return to normal operation for the balance, the tare switch 18 is actuated two or more times in quick succession. The control logic 20 responds by terminating the tare mode signal and by generating a clear signal. Termination of the tare mode signal causes the mode switch 14 to couple the input terminal 12 to the output terminal 16. The clear signal reduces the stored digital value within the null voltage generator 26 to the reference value.

Figure 2:
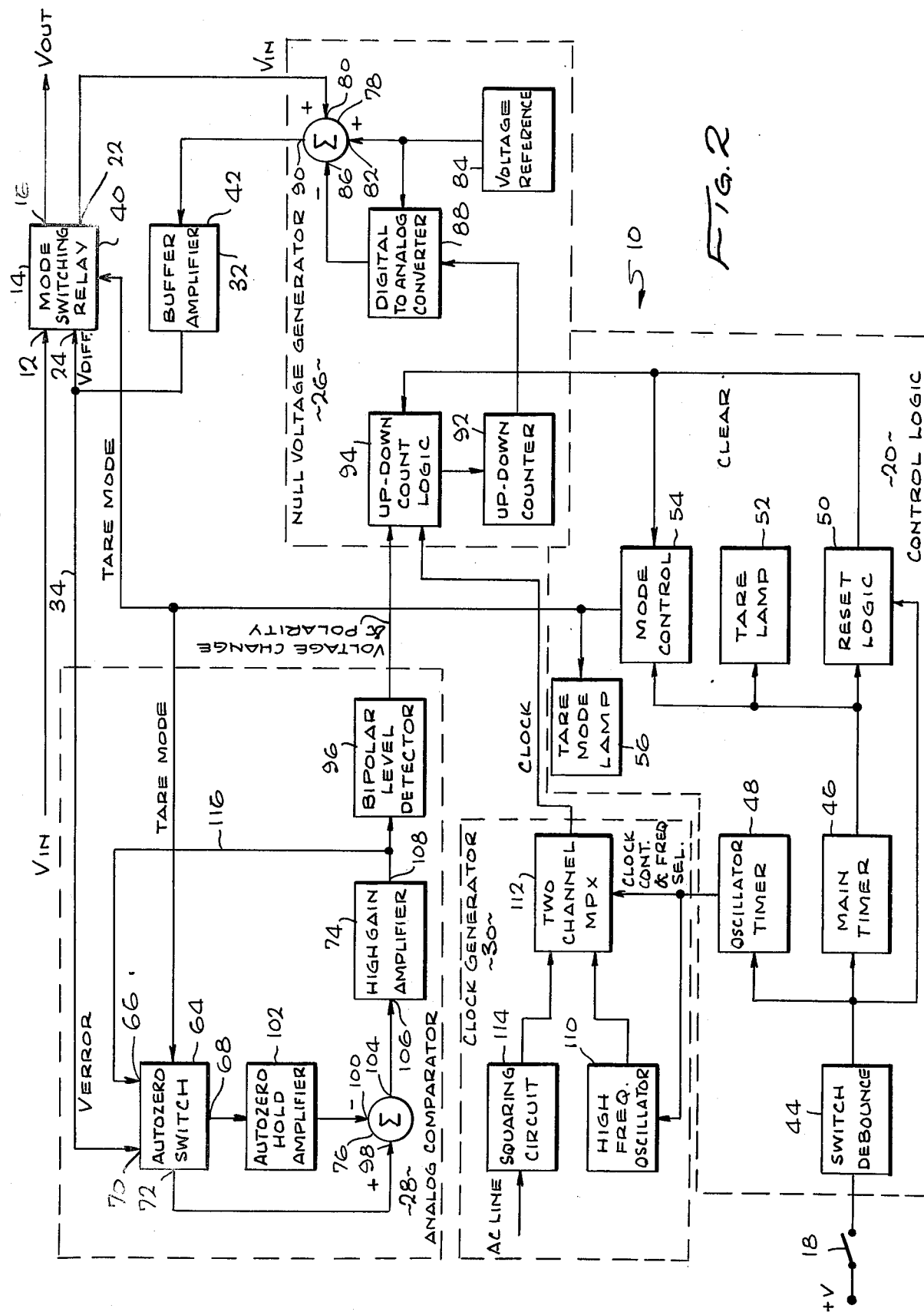
FIG. 2 is a detailed block diagram of the system of FIG. 1.

The electronic tare system 10 of FIG. 1 is shown in greater detail in FIG. 2. In the arrangement of FIG. 2 the mode switch 10 comprises a relay 40 and the buffer 32 comprises an amplifier 42. The relay 40 operates in the manner described in connection with the mode switch 14 of FIG. 1 to couple the input terminal 12 to the output terminal 16 during a normal mode of operation and to couple the input terminal 12 to the output terminal 22 and the input terminal 24 to the output terminal 16 when a tare mode signal from the control logic 20 is present.

The tare switch 18 is coupled through a switch debouncing circuit 44 to a main timer 46, an oscillator timer 48 and reset logic 50. The switch debounce 44 prevents application of more than one signal to the timers 46 and 48 and the reset logic 50 in response to a single closure of the tare switch 18.

When the system is operating in a normal mode such that the mode switching relay 40 couples the input terminal 12 to the output terminal 16 and the tare system 10 has no effect on the balance, a taring operation may be initiated by momentarily closing the tare switch 18. The main timer 46 responds by generating a pulse and applying it to the reset logic 50, a tare lamp 52 and a mode control 54. The reset logic 50 responds to the pulse by storing it in logic circuitry therein as an indication that a tare operation has been initiated. The tare lamp 50 responds to the pulse by turning on momentarily to signal the operator that the tare switch 18 has been successfully actuated. The mode control 54 responds to the pulse from the main timer 46 by generating a tare mode signal. The tare mode signal which is applied to the mode switching relay 40 and the analog comparator 28 causes a tare mode lamp 56 to illuminate and thereby provide a visual indication that the system is operating in the tare mode. The tare mode signal from the mode control 54 continues until such time as a clear signal is provided by the reset logic 50. The mode switching relay 40 responds to the presence of the tare mode signal by breaking the connection between the input terminal 12 and the output terminal 16 an instead coupling the input terminal 12 to the output terminal 22 and the input terminal 24 to the output terminal 16. An autozero switch 64 within the analog comparator 28 responds to the tare mode signal by uncoupling an input terminal 66 from an output terminal 68 and instead coupling an input terminal 70 to an output terminal 72. The coupling together of the terminals 70 and 72 activates the primary feedback loop 34 by coupling the buffer amplifier 42 to a high gain amplifier 74 within the analog comparator 28 by the terminals 70 and 72 and a summing junction 76.

The null voltage generator 26 includes an electrical summing junction 78 which has a positive input 80 coupled to the output terminal 22 of the mode switching relay 40, a positive input 82 coupled to a voltage reference 84, a negative input 86 coupled to the output of a digital-to-analog converter 88 and an output 90 coupled to the buffer amplifier 42. The null voltage generator 26 also includes an up-down counter 92 and associated up-down count logic 94. The up-down count logic 94 is coupled to the high gain amplifier 74 of the analog comparator 28 through a bipolar level detector 96. The high gain amplifier 74 amplifies $V_{ERROR}$ when the autozero switch 64 couples the input terminal 70 to the output terminal 72, and the bipolar level detector 96 responds to the amplifier output of the high gain amplifier 74 by providing a signal to the up-down count logic 94 which causes the up-down counter 92 to count in the proper direction so as to tend to reduce $V_{ERROR}$. The up-down count logic 94 is also coupled to receive the clock signal from the clock generator 30 and to pass the pulses comprising the clock signal to the up-down counter 92.

The up-down counter 92 stores a digital value which may cause the signal out from the summing junction 78 to change in bipolar fashion in response to the control signal from the analog comparator 28 and the clock signal from the clock generator 30. The digital value stored in the up-down counter 92 is converted into a corresponding analog signal and applied to the negative input terminal 86 of the summing junction 78 by the digital-to-analog converter 88. The digital-to-analog converter 88 requires a reference voltage in order to operate properly and is therefore coupled to the voltage reference 84. Since the voltage of the reference 84 is added to the output of the converter 88 and appears as the negative input terminal 86 of the summing junction 78, the voltage reference 84 is also coupled to the positive input 82 of the summing junction 78 to cancel the effect of the reference voltage from the converter 88 at the summing junction 78.

When the tare switch 18 is momentarily closed to initiate a taring operation and the mode switching relay 40 responds by coupling the input terminal 12 to the output terminal 22, the voltage $V_{IN}$ is applied to the positive input 80 of the summing junction 78 where it is algebraically combined with the output of the digital-to-analog converter 88 applied to the negative input 86. At this point the counter 92 is at the reference count and consequently the voltage at the output of the digital-to-analog converter 88 is also at the reference analog level. $V_{IN}$ therefore appears at the output of the buffer amplifier 42 and is passed to the input 70 of the autozero switch 64 as $V_{ERROR}$. With the input terminal 70 being coupled to the output terminal 72, $V_{ERROR}$ is applied to a positive input 98 of the summing junction 76 which has a negative input 100 coupled to an autozero hold amplifier 102 and an output 104 coupled to an input 106 of the high gain amplifier 74. The high gain amplifier 74 has an output 108 coupled to the input terminal 66 of the autozero switch 64 as well as to the bipolar level detector 96. However, the input terminal 66 is uncoupled from the output terminal 68, and a drift compensation signal appears at the negative input 100 of the summing junction 76. Accordingly, $V_{ERROR}$ at the positive input 98 is passed to the high gain amplifier 74 where it is amplified and applied to the bipolar level detector 96. The bipolar level detector 96 generates a signal in accordance with the polarity of $V_{ERROR}$, which signal is applied to the up-down count logic 94 to determine the direction of counting of the up-down counter 92. If $V_{ERROR}$ is positive, the bipolar level detector 96 provides a signal causing the counter 92 to count up, thereby increasing the voltage from the converter 88 at the negative input 86 and reducing $V_{ERROR}$. Conversely, if $V_{ERROR}$ is negative, the bipolar level detector 96 provides a signal causing the counter 92 to provide a decreasing voltage at the negative input 86 so as to reduce $V_{ERROR}$.

With the direction of counting of the counter 92 determined by the bipolar level detector 96 in the up-down count logic 94, the up-down counter 92 counts in that direction in response to clock pulses from the clock generator 30. As previously noted, the control logic 20 defines a time interval of selected duration during which time the tare system 10 is nulled by driving $V_{ERROR}$ to zero. The timing interval is provided by the main timer 46 which not only generates a pulse in response to momentary closure of the tare switch 18 to initiate the time interval but which also generates a pulse at the end of the predetermined time interval. The pulse marking the end of the time interval is passed via the mode control 54 to the autozero switch 64 where it uncouples the input terminal 70 from the output terminal 72 and instead couples the input terminal 66 to the output terminal 68. During the first part of the time interval, the clock generator 30 provides a high frequency clock signal to the counter 92. This is accomplished by the oscillator timer 48 which responds to momentary closure of the tare switch 18 by turning on a high frequency oscillator 110 and controlling a two channel multiplexer 112 so as to couple the high frequency output of the oscillator 110 to the counter 92 via the up-down count logic 94. At the end of this first portion of the time interval, the oscillator timer 48 turns off the oscillator 110 and conditions the multiplexer 112 to couple a squaring circuit 114 to the counter 92 via the logic 94. The squaring circuit 114 which is coupled to receive AC line voltage squares the waveform of the voltage prior to passing it to the counter 92. The resulting signal of squared waveform comprises a clock signal of low frequency in that the frequency thereof is substantially less than the frequency of the oscillator 110. This low frequency clock signal is applied to the counter 92 during the second portion of the time interval defined by the main timer 46. At the end of the second portion of the time interval which coincides with the end of the time interval itself, the resulting pulse provided by the main timer 46 which changes the state of the autozero switch 64 so as to uncouple the input terminal 70 from the output terminal 72 has the effect of stopping the counter 92. With the zero reference signal present at the output terminal 72 of the autozero switch 64, the output of the high gain amplifier 74 is virtually at zero and the bipolar level detector 96 terminates the control to the up-down count logic 94. The logic 94 responds by disabling the up-down counter 92 at the digital value stored therein despite the continued application of low frequency clock pulses to the logic 94 from the clock generator 30.

The two-frequency clock generator 30 is advantageous in that it enables coarse adjustment of the system at a rapid rate followed by fine adjustment at a slow rate so as to achieve nulling in a fast and efficient and yet precise manner. In the present example the high frequency oscillator 110 provides clock pulses at a frequency of 0.5 MHz for approximately 75% of the time interval defined by the main timer 46. Consequently the squaring circuit 114 provides clock pulses of 50 or 60 Hz frequency for the remaining 25% of the time interval. The time interval provided by the main timer 46 is approximately 4 seconds in duration. Consequently the high frequency clock is applied to the counter for the first 3 seconds, and the low frequency clock is provided to the counter during the remaining second of the time interval. It has been found that the system 10 is usually close to a null condition at the end of the first 3 seconds of the time interval when the clock frequency is changed, and therefore only a small portion of the remaining second is required to achieve a precise null at the low clock frequency.

As previously noted the termination of the 4 second time interval coincides with generation of a pulse by the main time 46 to change the state of the autozero switch 64 such that the input terminal 70 is uncoupled from the output terminal 72 and the input terminal 66 is coupled to the output terminal 68. This deactivates the primary feedback loop 34 and at the same time activates a negative feedback loop 116 coupled between the output 108 and the input 106 of the high gain amplifier 74. The negative feedback loop 116 includes the autozero switch 64, the autozero hold circuit 102 and the summing junction 76. The negative feedback loop 116 compensates for the drift inherent in most high gain dc amplifiers and provides a reference enabling the system to commence counting in the proper direction upon receipt of the next tare command from the switch 18. The negative feedback loop 116 attempts to maintain the output 108 of the high gain amplifier 74 at zero by biasing the input 106. As signals appear at the output 108, they are applied to the autozero hold amplifier 102 which acts as a sample and hold circuit by providing a signal at the negative input 100 to the summing junction 76 so as to tend to drive the output 108 of the high gain amplifier 74 to zero.

When it is desired to weigh a new sample using the same sample holder, the old sample is removed and the new sample is placed on the sample holder. Since the counter 92 already stores a digital value representing the exact weight of the sample holder, the system 10 quickly determines the weight of the new sample at the summing junction 78 where the voltage at the output of the converter 88 representing the sample holder is subtracted from the new $V_{IN}$ to provide to the digital read out of the balance a new difference voltage $V_{DIFF}$ representing the weight of the new sample. An alternate method of weighing a new sample is to momentarily depress switch 18 causing the system 10 to operate and null the $V_{IN}$.

When the tare mode of operation is to be terminated in favor of the normal mode of operation, the tare switch 18 is actuated two or more times in quick succession. Upon the first actuation of the switch 18 the main timer 46 generates a pulse which is provided to the reset logic 50 as the main timer 46 starts through the 4 second timing interval. When the tare switch 18 is actuated a second time within the 4 second timing interval, the resulting signal through the reset logic 50 causes the reset logic 50 to generate a clear signal. The clear signal is applied to the mode control 54 to terminate the tare mode signal and thereby return the mode switching relay 40 to the first state in which the input terminal 12 is coupled to the output terminal 16. The clear signal is also applied to the up-down count logic 94 to clear the count stored in the up-down counter 92. With the tare mode signal from the mode control 54 terminated, the tare mode lamp 56 goes out indicating that the system is no longer operating in the tare mode.

FIG. 3 is a schematic diagram of the circuit comprising the reset logic 50. The reset logic 50 includes a pair of cross coupled NAND circuits 124 and 126 coupled to the tare switch 18 and the switch debounce 44. The output of the NAND circuit 126 is coupled to one of the inputs of a NAND circuit 128 having a second input coupled to the main timer 46 and an output coupled as one of the inputs of a pair of cross coupled NAND circuits 130 and 132. The other input of the cross coupled NAND circuit pair 130 and 132 is coupled to the main timer 46. The output of the NAND circuit 132 provides the clear signal.

The various NAND circuits 124, 126, 128, 130 and 132 operate as latches which are set and reset as the various pulses from the switch debounce 44 and the main timer 46 occur. The clear signal output from the NAND circuit 132 is maintained at zero so long as the NAND circuits 124 and 126 do not receive a second or subsequent pulses from the switch debounce 44 during the 4 second timing interval. At the beginning of the tare operation a pulse from the switch debounce 44 is applied to one input of each of the NAND circuits 124 and 126 at the same time as a pulse is applied to one of the inputs of the NAND circuits 128 and 132 from the main timer 46 as the 4 second timing interval is initiated. If a further pulse is received by the NAND circuits 124 and 126 from the switch debounce 44 during the 4 second interval, the state of the NAND circuit 128 is changed so as to change the states of the NAND circuits 130 and 132 and produce a clear signal at the output of the NAND circuit 132. On the other hand if the switch debounce 44 does not provide a further signal during the 4 second interval, then the 4 second time interval terminates with a pulse from the main timer 46 changing the state of the NAND circuit 128 such that the next pulse from the switch debounce 44 results in the initiation of a new 4 second time interval.

A schematic diagram of a circuit comprising the analog comparator 28 and the up-down count logic 94 is shown in FIG. 4. The autozero switch 64 comprises two different solid state switches 134 and 136 which are ganged together to operate jointly under the control of the driver 138 coupled to receive the tare mode signal from the mode control 54. The switches 134 and 136 are shown in FIG. 4 in the positions they assume during normal operation in which the input terminal 66 is coupled to the output terminal 68 to activate the negative feedback loop 116. Upon initiation of a tare operation, the tare mode signal from the mode control 54 energizes the driver 138 to change the positions of the switches 134 and 136 from that shown in FIG. 4 such that the switch 134 couples the input terminal 70 to the output terminal 72 and the switch 136 uncouples the input terminal 66 from the output terminal 68. This couples the buffer amplifier 42 to the positive input 98 of the summing junction 76 such that $V_{ERROR}$ is passed to the input 106 of the high gain amplifier 74. The high gain amplifier 74 includes a differential amplifier 144 having a positive input coupled to ground through a resistor 146, a negative input coupled to the input 106 and an output coupled to the output 108. A resistor 148 and a capacitor 150 are coupled in parallel across the differential amplifier 144 between the input 106 and the output 108.

The autozero hold circuit 102 includes a differential amplifier 152 having an output coupled to the negative input of the summing junction 76, a positive input coupled to the output terminal 68 of the autoswitch 64 and a negative input coupled to ground through a resistor 154. The positive input of the differential amplifier 152 is also coupled to ground through the serial combination of a resistor 156 and a capacitor 158. The negative input of the differential amplifier 152 is coupled to the output through a capacitor 160. When the input terminal 66 is coupled to the output terminal 68, signals appearing at the output 108 of the high gain amplifier 74 are passed to the positive input of the differential amplifier 152 where they also charge the capacitor 158 to provide a sampling voltage. The differential amplifier 152 responds to the difference between the two inputs thereto by generating an output signal which is applied to the negative input of the differential amplifier 144 within the high gain amplifier 74 so as to tend to drive the voltage at the output 108 to zero.

During the 4 second time interval of a tare operation in which the switch 134 couples the buffer amplifier 42 to the high gain amplifier 74, the signal at the output terminal 108 of the amplifier 74 is passed to the positive input of a differential amplifier 162 and the negative input of a differential amplifier 164 comprising the bipolar level detector 96. The negative input of the differential amplifier 162 is coupled to ground, as is the positive input of the differential amplifier 164. The differential amplifier 162 and 164 reference the signal at the output 108 of the high gain amplifier 74 to ground. Thus if the voltage at the output 108 is positive relative to ground, the differential amplifier 162 provides a signal through the upper one of the pair of circuits comprising an up-down latch 166. This allows the clock pulses to pass via a NAND circuit 168 to cause the up-down counter 92 to count up. Conversely, when the voltage at the output 108 of the high gain amplifier 74 is negative relative to ground, the differential amplifier 164 within the bipolar level detector 96 changes the state of the up-down latch 166 so as to apply clock pulses via a NAND circuit 170 to have the counter 92 count down. The generation of a clear signal clears the up-down latch 166. The inputs of the up-down latch 166 are strobed by the clock, preventing extraneous up or down pulses from causing burst errors.

While the invention has been particularly shown and described with reference to a preferred embodiment thereof, it will be understood by those skilled in the art that various changes in forms and details may be made therein without departing from the spirit and scope of the invention.

What is claimed is:

1. An electronic tare system for use with a balance which generates an electrical weight signal representing a mass being weighed, comprising:

counter means capable of counting and storing a count therein;

means coupled to the counter means for providing an electrical counter signal representing a count in the counter means;

means responsive to a tare command for causing the counter means to count to a value at which the electrical counter signal is equivalent to the electrical weight signal; and means for thereafter algebraically combining the electrical counter signal with the electrical weight signal.

2. The invention set forth in claim 1, wherein the means for providing an electrical counter signal comprises a digital-to-analog converter, and the means for causing the counter means to count and the means for thereafter algebraically combining together comprise a switching relay coupled to receive the electrical weight signal, a summing junction having separate inputs coupled to the switching relay and the digital-to-analog converter and an output coupled to the switching relay, feedback loop means coupled between the output of the summing junction and the counter means for controlling counting by the counter means in accordance with a signal condition at the output of the summing junction and means for providing pulses at a desired rate to be counted by the counter means.

3. The invention set forth in claim 2, wherein the feedback loop means includes high gain amplifier means having an output coupled to the counter means and in input, switching means coupled between the input of the high gain amplifier means and the output of the summing junction and responsive to the tare command to assume a first state at which the input of the high gain amplifier means is coupled to the output of the summing junction, and a negative feedback loop coupled through the switching means from the output to the input of the high gain amplifier means and operative when the switching means assumes a second state different from the first state to bias the input of the high gain amplifier means to tend to drive the output of the high gain amplifier to zero.

4. An electronic tare system for use with a balance which generates an electrical weight signal representing a mass being weighed, comprising:

an input terminal coupled to receive the electrical weight signal;

an output terminal coupled to display means for the balance;

switching means coupled between the input terminal and the output terminal and operative to couple the input terminal to the output terminal when in a first condition, the switching means assuming a second condition different from the first condition in response to a tare command;

signal summing means having a plurality of inputs and an output, one of the inputs being coupled to the input terminal and the output being coupled to the output terminal when the switching means is in the second condition;

means coupled to the output of the signal summing means and operative to generate and store a digital value representing a signal at the output of the signal summing means in response to the tare command; and means coupled between the means operative to generate and store and one of the inputs of the signal summing means for providing a signal at said one of the inputs having a magnitude and polarity representing the digital value stored in the means coupled to generate and store.

5. The invention set forth in claim 4, wherein the means coupled to generate and store includes a counter, means for providing pulses to the counter and means for controlling the counter in response to the magnitude of a signal at the output of the signal summing means.

6. The invention set forth in claim 5, wherein the means for providing pulses to the counter is operative to provide pulses at a first frequency during a first interval following a tare command and at a second frequency lower than the first frequency during a second interval following the first interval.

7. The invention set forth in claim 5, wherein the counter is an up-down counter and the means for controlling the counter also controls the direction of counting by the counter in response to the polarity of a signal at the output of the signal summing means.

8. An electronic tare system for a balance in which the magnitude of an electrical signal used to compensate for a mass being weighed is measured, comprising:

means for defining a time interval of selected duration in response to a tare command;

means responsive to the means for defining a time interval for providing a tare mode signal during the time interval;

means responsive to the means for defining a time interval for generating a clock signal during the time interval, the clock signal having a first frequency during a first portion of the time interval and a second frequency substantially less than the first frequency during a second portion of the time interval;

an up-down counter coupled to count in response to the clock signal when an enable signal is applied thereto, the counter counting up or down as determined by the enable signal;

means for converting the count in the counter into a corresponding analog null signal;

a summing junction having a negative input coupled to the means for converting, a positive input, and an output;

buffer means coupled to the output of the summing junction;

an input terminal coupled to receive the electrical signal from the balance;

an output terminal coupled to a display for the balance;

a mode switching relay coupled to the input terminal, the output terminal, the positive input of the summing junction and the buffer means and to receive the tare mode signal, the mode switching relay being operative to couple the input terminal to the output terminal when in a first state and to change to a second state upon receipt of a tare mode signal, the relay coupling the input terminal to the summing junction and the buffer means to the output terminal when in the second state;

amplifier means coupled to the buffer means for amplifying a signal at the buffer means; and means coupled between the amplifier means and the up-down counter for providing an enable signal whenever the amplifier means provides an amplified signal above a predetermined level, the enable signal causing the counter to count up or down in accordance with the polarity of the amplified signal.

9. The invention set forth in claim 8, further comprising switch means coupled to the buffer means, a second summing junction having a positive input coupled to the switch means, a negative input, and an output coupled to the amplifier means, means coupling an output of the amplifier means opposite the second summing junction to the switch means, and a sample and hold circuit coupled between the switch means and the negative input of the second summing junction, the switch means coupling the output of the amplifier means to the sample and hold circuit when in a first state and being responsive to the tare mode signal to change to a second state in which the output of the amplifier is uncoupled from the sample and hold circuit and the buffer means is coupled to the positive input of the second summing junction.

10. The invention set forth in claim 8, further including means responsive to each tare command for generating a clear signal whenever more than one tare command occurs within a time interval of selected duration, means applying the clear signal to the means for providing a tare mode signal to terminate the tare mode signal and means for applying the clear signal to the up-down counter to clear any count in the counter.

11. The invention set forth in claim 10, wherein the means for defining a time interval generates a first signal in response to a tare command to initiate a time interval of selected duration and a second signal at the end of the time interval and the means for generating a clear signal is operative to generate a clear signal when two of the first signals are generated without an intervening second signal.

12. The invention set forth in claim 8, wherein the means for generating a clock signal includes means for generating a frequency change signal at the end of a time period following receipt of a tare command, the time period comprising the first portion of the time interval of selected duration, means for generating a signal having the first frequency, means for generating a signal having the second frequency, and multiplexer means coupled between the up-down counter and the means for generating signals having the first and second frequencies, the multiplexer means being operative to couple the means for generating a signal having the first frequency to the counter upon receipt of a tare command and to couple the means for generating a signal having the second frequency to the counter upon receipt of the frequency change signal.

13. An electronic balance system comprising the combination of:
 means for generating an electrical weight signal having a magnitude representing a mass being weighed;
 display means responsive to an electrical signal for providing a display representing the magnitude of the electrical signal;
 means for applying the electrical weight signal to the display means during a normal mode of operation;
 electrical junction means;
 means for coupling the electrical weight signal to the electrical junction means during a tare mode of operation different from the normal mode of operation;
 means for coupling the electrical junction means to the display means during the tare mode of operation;
 means coupled to the electrical junction means for generating and storing a value in accordance with the combined magnitude of electrical signals at the electrical junction means during a first portion of the tare mode of operation; and
 means responsive to the stored value for providing an analog electrical signal representing the stored value to the electrical junction means.

14. The invention set forth in claim 13, wherein the means for generating and storing a value includes a first feedback loop coupled to the electrical junction means and including high gain amplifier means having an input and an output, the high gain amplifier means providing an amplified signal representing the combined magnitude of electrical signals at the electrical junction means during said first portion of the tare mode of operation, and a second feedback loop coupled between the output and the input of the high gain amplifier means and operative to bias the input to compensate for drift of the high gain amplifier means during a second portion of the tare mode of operation subsequent to the first portion.

* * * * *